W. C. KEYS.
RIM.
APPLICATION FILED JULY 17, 1919.
1,407,467.　　　　　　　　　　　　Patented Feb. 21, 1922.
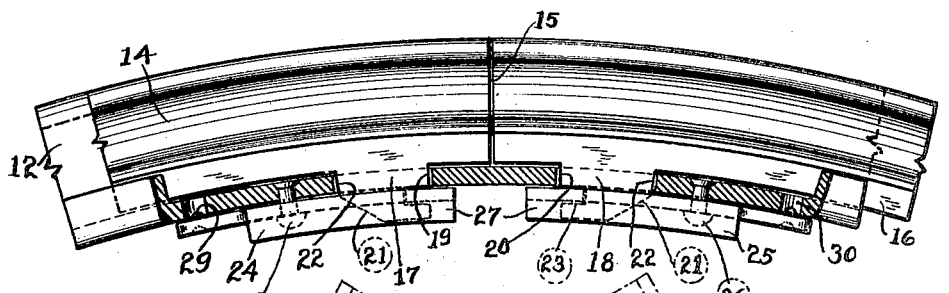
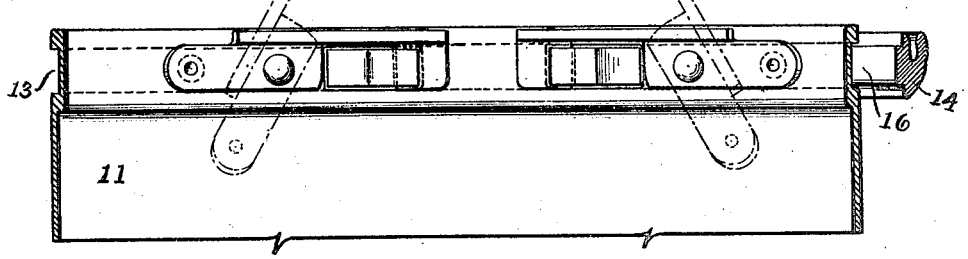
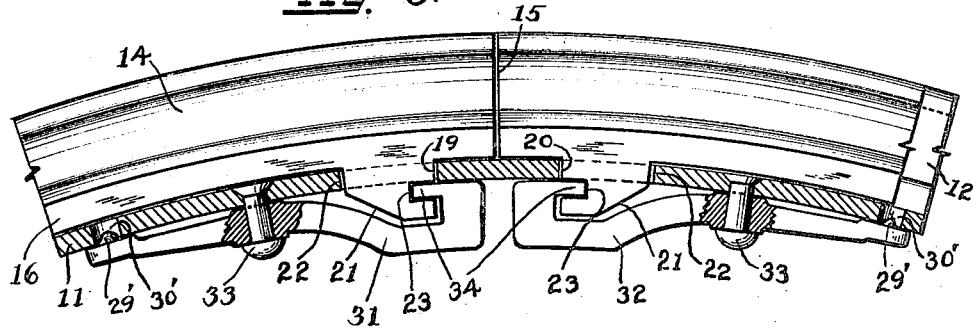
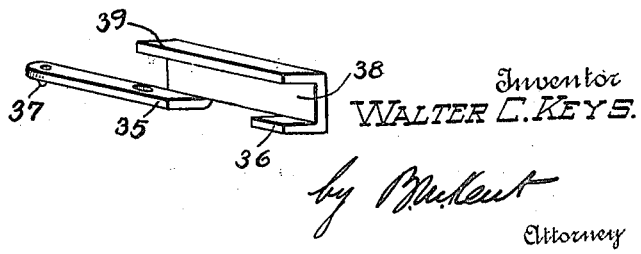
Inventor
WALTER C. KEYS.
by B. M. Kent
Attorney

UNITED STATES PATENT OFFICE.

WALTER C. KEYS, OF CLEVELAND, OHIO, ASSIGNOR TO THE STANDARD PARTS COMPANY, OF CLEVELAND, OHIO, A CORPORATION OF OHIO.

RIM.

1,407,467.　　　　　Specification of Letters Patent.　　Patented Feb. 21, 1922.

Application filed July 17, 1919. Serial No. 311,458.

*To all whom it may concern:*

Be it known that I, WALTER C. KEYS, a citizen of the United States, and a resident of Cleveland, county of Cuyahoga, State of Ohio, have invented certain new and useful Improvements in Rims, of which the following is a specification.

This invention relates to rims for vehicle wheels and more particularly to rims of the so-called quick-detachable type in which a side ring is detachably seated at one edge thereof, to facilitate the removal and replacing of a tire on the rim, and has for one of its objects the provision of a simple and effective means for holding the side ring in seated position upon the rim.

Other objects of the invention and the features of novelty will be apparent from the following description, taken in connection with the accompanying drawings, in which:—

Figure 1 is a fragmentary side elevation of a rim embodying my invention, part of the rim being broken away at one point to more clearly disclose the structure;

Fig. 2 is a fragmentary bottom plan view of the structure shown in Fig. 1;

Fig. 3 is an elevation similar to Fig. 1, but showing latch members of a modified form; and Fig. 4 is a view in perspective of another modified form of latch member which may be used in the structure shown in Fig. 1.

In the drawings, 11 indicates a vehicle wheel rim having a tire-retaining flange 12 at one edge thereof and a circumferential channel or groove 13 adjacent its other edge to receive a side ring 14 which is transversely split at 15 and is adapted to be detachably seated on the rim. A base or web 16 extends inwardly from the side ring 14 and enters the groove 13 and interlocks with the outer side wall thereof to hold the ring from lateral motion on the rim, the ring being sufficiently resilient to permit the web 16 to be lifted over the side wall of the groove 13. The side ring 14 is provided, adjacent the ends thereof, with a pair of lugs 17 and 18, which extend inwardly from the web 16 and are adapted to be seated in apertures 19 and 20, respectively, which are formed in the rim at the bottom of the groove 13. A part of the rear face of each of the lugs 17 and 18 is inclined forwardly and inwardly, as indicated at 21, for a purpose to be later described, and abrupt shoulders 22 are formed on the lugs adjacent to the web 16, to cooperate with the rim at the ends of the aperture 19 and 20 to hold the ring from circumferential motion on the rim. Each of the lugs is provided with a transverse slot 23 in its forward edge and independent latch members are provided to engage in the slots in the lugs and hold the ends of the ring in seated position.

In the structure shown in Figs. 1 and 2, the latch members 24 and 25 are pivotally mounted on the rim 11 by rivets, or in any other suitable manner, and may be formed of stock metal of uniform thickness, a portion of each latch member being bent to form an inwardly extending flange 27 which serves not only to strengthen the member, but also to protect the lug with which it cooperates. A part of each latch member is cut away to permit it to be swung on its pivot so that the laterally extending portion 28 thereof will engage in the slot 23 of the lug, and the body portion of the latch member may be provided with a boss or projection 29 which is adapted to engage in an opening 30 in the rim to hold the latch member in locking position.

In Fig. 3, I have shown latch members 31 and 32 which are pivotally mounted on the rim 11, as by rivets 33, each of said members having a hook-shaped end thereon which extends under its lug and has a radially extending portion on which is formed the tongue 34 which is adapted to engage in the slot 23 of the lug. The latch members 31 and 32 may be provided with bosses or projections 29' to engage in openings 30' in the rim to hold the members in locking position, and it will be noted that these latch members are interchangeable, a considerable economy of manufacture being effected thereby.

In Fig. 4, I have shown a latch member 35 which may be used in place of the latch member 24 shown in Fig. 1, to interlock with the lug 17, it being understood that a symmetrically formed member may be used to interlock with the lug 18. The latch member 35 is formed with a laterally projecting portion 36 and a boss or projection 37, similar to the corresponding parts of the latch member 24. The latch member 35 is also formed with a flange 38, similar to the flange 27 of the latch member 24, but is further provided with a flange 39 which extends laterally from the flange 38, the body of the member being channel-shaped in cross-section. The flange 39 is adapted to underlie the lug with which the latch member cooperates, when the parts are in locked relation and will increase the rigidity of the latch member and effectively protect the lug.

When it is desired to replace the side ring 14 upon the rim 11, either end of the ring may be placed upon the rim so that the lug 17 or 18 thereon extends through its aperture 19 or 20 and the corresponding latch member swung into position to engage in the slot 23 in the lug and hold it in seated position. The ring is then progressively seated around the circumference of the rim until the lug at the other end of the ring registers with its aperture. If the ring is not completely contracted, the inclined face 21 of the lug will facilitate the contraction of the ring and the seating of the lug in its aperture by radially inward pressure on the ring, by reason of the engagement of such inclined face with the rim at the end of the aperture.

In the use of rims of this type, it frequently happens that the side ring becomes deformed out of true circular shape and also sprung laterally so that the ends are not normally in alinement when the ring is off of the rim. Since means are provided for independently locking each end of the side ring to the rim, it will be seen that in seating the side ring upon the rim, one may begin with either end thereof and, by locking it in place, effectively prevent it from accidentally escaping from its aperture while the rest of the ring is being seated.

Having thus described my invention, what I claim is:—

1. The combination of a tire-carrying rim having a circumferential groove adjacent one edge thereof, a transversely split side ring having a part thereof seated in said groove, and means for locking said ring in seated position upon said rim, comprising a lug on said ring adapted to extend through said rim and having a transverse slot in its forward edge, and a latch pivoted to said rim and extending under said lug and having at its end a rearwardly directed tongue adapted to enter the slot in said lug.

2. The combination of a tire-carrying rim having a circumferential groove adjacent one edge thereof, a transversely split side ring having a part thereof seated in said groove, means for locking said ring in seated position upon said rim, comprising a lug on said ring adapted to extend through said rim and having a transverse slot in its forward edge, and a latch pivoted to said rim and extending under said lug and having at its end a rearwardly directed tongue adapted to enter the slot in said lug, and means for holding said latch in lug engaging position.

In testimony whereof I affix my signature.

WALTER C. KEYS.